US011653601B2

(12) United States Patent
Choe

(10) Patent No.: US 11,653,601 B2
(45) Date of Patent: May 23, 2023

(54) PLANT CULTIVATION SYSTEM USING PLANT HANGERS WITH PLANT TRAYS AT MULTIPLE HEIGHTS

(71) Applicant: KOREA WHEEL CORPORATION, Boryeong-si (KR)

(72) Inventor: Hun Choe, Boryeong-si (KR)

(73) Assignee: KOREA WHEEL CORPORATION, Boryeong-si (KR)

( * ) Notice: Subject to any disclaimer, the term of this patent is extended or adjusted under 35 U.S.C. 154(b) by 156 days.

(21) Appl. No.: 17/219,870

(22) Filed: Mar. 31, 2021

(65) Prior Publication Data

US 2022/0322612 A1    Oct. 13, 2022

(51) Int. Cl.
*A01G 9/02* (2018.01)
*A01G 9/04* (2006.01)

(52) U.S. Cl.
CPC .............. *A01G 9/024* (2013.01); *A01G 9/045* (2013.01)

(58) Field of Classification Search
CPC ........ A01G 9/024; A01G 31/00; A01G 31/04; A01G 31/042; A01G 31/045
See application file for complete search history.

(56) References Cited

U.S. PATENT DOCUMENTS

| | | |
|---|---|---|
| 2,710,319 A | 6/1955 | Bush |
| 3,074,356 A | 1/1963 | Parker et al. |
| 3,589,503 A | 6/1971 | Leach |
| 3,590,745 A | 7/1971 | Ouska |
| 3,762,535 A | 10/1973 | Becker et al. |
| 3,774,548 A | 11/1973 | Borst |
| 4,170,089 A * | 10/1979 | Smrt ...................... A01G 9/024 47/79 |
| 4,598,812 A | 7/1986 | Grube |

(Continued)

FOREIGN PATENT DOCUMENTS

| | | |
|---|---|---|
| CN | 102368900 A | 3/2012 |
| GB | 1076820 A | 7/1967 |

(Continued)

OTHER PUBLICATIONS

International Search Report, PCT/KR2019/008581, dated Oct. 18, 2019 (4 pages).

*Primary Examiner* — Kristen C Hayes
(74) *Attorney, Agent, or Firm* — R. Reams Goodloe, Jr.

(57) ABSTRACT

A plant hanger assembly having multiple level plant trays, useful for growing plants in an upright configuration is provided for use with a trolley conveyor. A plurality of plant trays of selected size and shape are provided spaced apart along a vertical axis. A vertical support shaft has an upper end and a lower end. The plant trays may be circular in shape, with sloping sidewalls. The sloping sidewalls may be angled out sufficiently that the plant trays can be stacked in a nested configuration for storage. The plant trays include a base having grooved channels for transfer of water on the obverse side, and reinforcing ribs for strength, on the reverse side. Apertures between the obverse side and the reverse side allow excess water in an upper plant tray to drain downward into a plant tray therebelow. Shaft couplers are provided, with attachment rings or pins, to securely join the plant trays to the vertical support shaft. The plant hangers are adapted for attachment to and use with a trolley conveyor in a plant factory.

16 Claims, 6 Drawing Sheets

(56) References Cited

U.S. PATENT DOCUMENTS

| | | |
|---|---|---|
| 4,715,288 A | 12/1987 | Catena |
| 4,716,839 A | 1/1988 | Catena |
| 5,074,220 A | 12/1991 | Petersen |
| 5,199,580 A * | 4/1993 | Bankier ................. B65G 17/20 211/113 |
| 6,125,991 A | 10/2000 | Veldkamp et al. |
| 6,386,355 B1 | 5/2002 | Willems |
| 6,450,326 B1 | 9/2002 | Hoffmann et al. |
| D506,160 S * | 6/2005 | Lambert ...................... D11/148 |
| 6,910,425 B2 | 6/2005 | Galpin |
| 10,017,327 B2 | 7/2018 | Okamura et al. |
| 10,136,587 B1 * | 11/2018 | Johnson ................. A01G 9/023 |
| 10,280,005 B2 | 5/2019 | Stauber |
| 10,550,881 B2 | 2/2020 | Lavigno, IV et al. |
| 10,676,283 B2 | 6/2020 | Gumbel et al. |
| 11,046,526 B1 | 6/2021 | Hyvarinen et al. |
| 2004/0084288 A1 | 5/2004 | Ashida et al. |
| 2012/0137578 A1 | 6/2012 | Bradford et al. |
| 2013/0284569 A1 | 10/2013 | Studer |
| 2015/0173315 A1 | 6/2015 | Aznar Vidal |
| 2019/0110416 A1 * | 4/2019 | Crain ...................... A01G 31/06 |
| 2021/0127596 A1 | 5/2021 | Kim |
| 2021/0127597 A1 | 5/2021 | Choe |
| 2021/0130102 A1 | 5/2021 | Kim |
| 2021/0147154 A1 | 5/2021 | Choe |
| 2022/0046875 A1 * | 2/2022 | Clemmer ............. A01G 31/045 |
| 2022/0221328 A1 * | 7/2022 | Coffin .................... G01G 19/18 |

FOREIGN PATENT DOCUMENTS

| | | |
|---|---|---|
| JP | H08127411 A | 5/1996 |
| JP | H10215701 A | 8/1998 |
| KR | 10-2103298 | 4/2020 |
| WO | WO 2020/054958 A1 | 3/2020 |

* cited by examiner

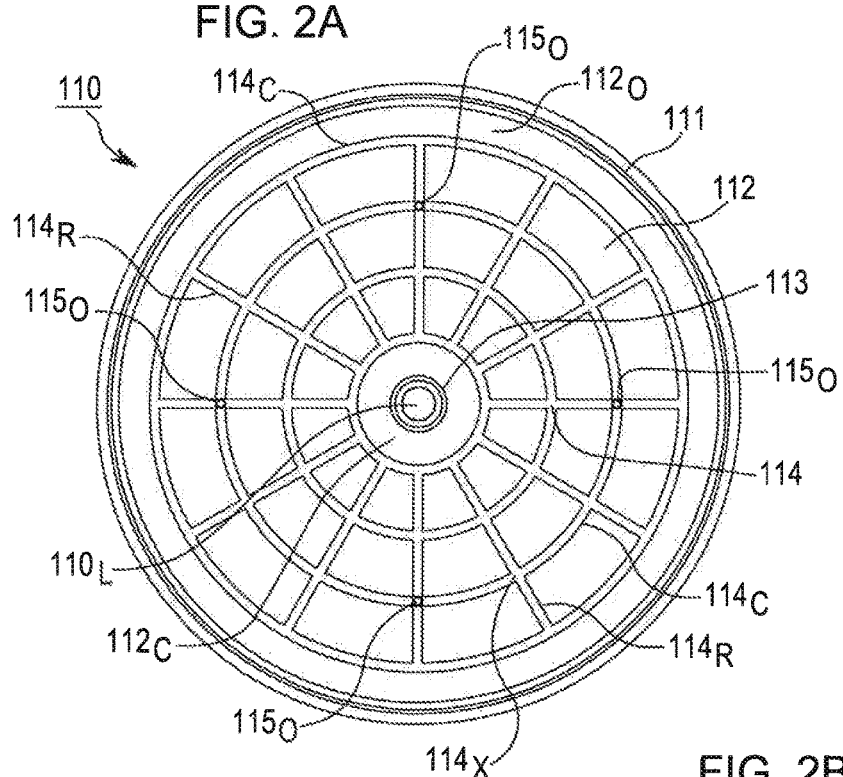
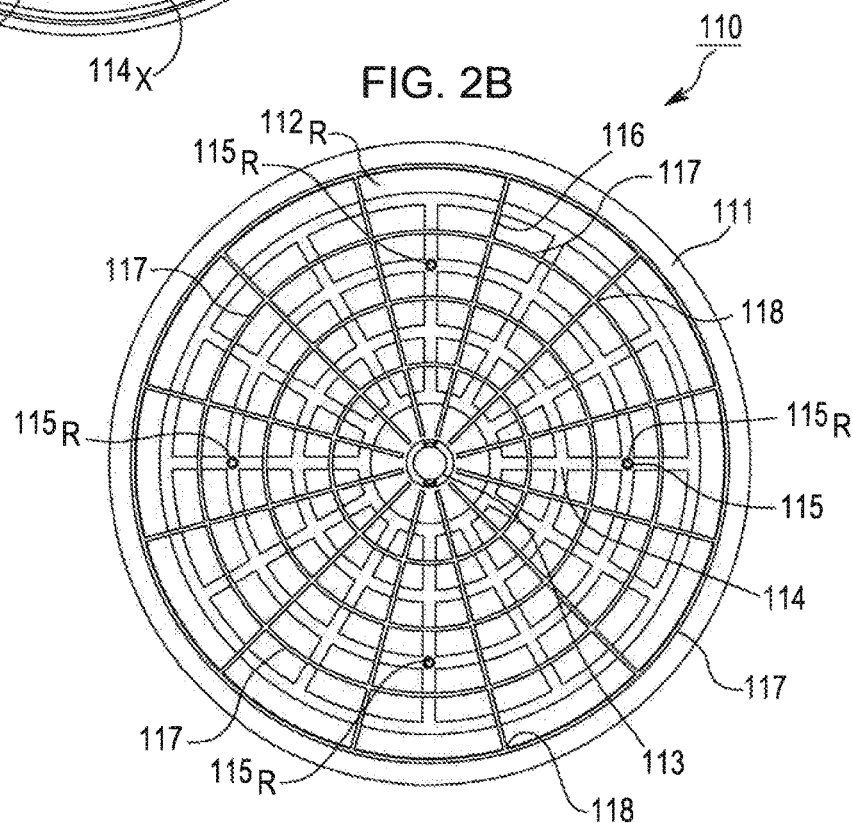

US 11,653,601 B2

PLANT CULTIVATION SYSTEM USING PLANT HANGERS WITH PLANT TRAYS AT MULTIPLE HEIGHTS

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever

RELATED PATENT APPLICATIONS

None

TECHNICAL FIELD

This disclosure relates generally to the field of horticulture, and more particularly, to indoor horticulture, and more specifically, to apparatus and devices for support of plants while suspended from an endless track trolley conveyor system.

BACKGROUND

Plant factories that grow plants in large quantities for sale are increasingly common. An example of such a plant factory was disclosed in Korean Patent Publication No. 10-2017-0025460, published on Mar. 8, 2017, entitled A METHOD OF CULTIVATING SPINACH BY USING LIGHT QUALITY IN A CLOSED-TYPE PLANT FACTORY SYSTEM. However, when cultivating plants in a plant factory, there is limited space available in which to grow plants. Also, it would be advantageous to expose plants being grown to as much light, at the correct times, as possible, in order to improve the quality of plants from the plant factory. In addition, it would be advantageous to avoid the expense and hassle of having to change the position of each plant bed while the worker moves around the factory one by one. Additionally, use of all available space would be advantageous, so as maximize return on the operating costs incurred for maintaining lighting, temperature, and moisture control in a plant factory. Thus, a need exists to improve on equipment for growing plants in a plant factory.

SOME OBJECTS, ADVANTAGES, AND NOVEL FEATURES

An object of the invention(s) disclosed herein is to solve the above-described problem, by providing a multi-level assembly of plant trays which are spaced apart vertically, and arranged in a configuration wherein water adequately drains through and out of each plant tray, when the plant trays are arranged one above the other.

Another object of the invention(s) disclosed herein is to provide a multi-level assembly of plant trays which are spaced apart vertically, which can be coupled to a trolley conveyor provided on the ceiling of a plant factory, so that plants can be moved to any desired working location, such as a planting location, a storage location, growing location, a watering location, or harvest location.

Yet another object of the present invention is to provide a multi-level assembly of plant trays which may be used to neatly arrange plants in vertically spaced apart plant trays, so that vertical space within a plant factory is efficiently utilized. Thus, it is an advantage that with plant cultivation systems using the novel multi-level assembly of plant trays, using a plurality of plant trays arranged in a multistage structure in a vertical direction, plant cultivation efficiency per unit area of the plant factory can be improved.

It is an advantage that plants grown in a multi-level assembly of plant trays where plants are neatly arranged for growing in vertically spaced apart plant trays, are easily accessed at a workstation when using a trolley conveyor for transport of the plant hangers that provide a multi-level assembly of plant trays.

In addition, there is an advantage in that it is easy to supply the same amount of sunlight, or artificial light, to a plurality of plant trays since the location in a plant factory of the plants being grown can be freely changed by the movement by the trolley conveyor.

Further, when water is supplied to the plants in an uppermost plant tray in a plurality of plant trays, the presence of a water discharge port provided by a plurality of through apertures in the base of each of the plant trays allows the discharge of water from each plant tray, for example from an uppermost plant tray to the next plant tray therebelow and thence sequentially water may be supplied to the lowest potted plant, even though only plants in an uppermost plant tray may be directly watered. Accordingly, even if a worker does not supply water to all of the plants in the plant trays arranged in a vertical spaced apart relationship, and water is supplied only to a top tray, in effect, water is still provided to plants in all of the plant trays.

It is an advantage of the multi-level assembly of plant trays as disclosed herein are easily transportable on a trolley conveyor, for ease of movement in a plant factory.

The above objects and various advantages of the invention(s) as disclosed herein will become more apparent from the description provided and details of various embodiments, as will be understood by those skilled in the art.

SUMMARY

A novel plant hanger with a multi-level assembly of plant trays has been developed and is described herein. The plant hanger with a multi-level assembly of plant trays includes a plurality of plant trays in which plants are grown. The plant trays are spaced apart vertically and clamped to a vertical support shaft. The multi-level assembly is supported from a trolley conveyor, either directly using the vertical support shaft, or using a hangar affixed to an uppermost plant tray in the plurality of plant trays. Preferably the plant trays are circular, and the plant trays are coupled to their vertical support shaft at the center of each plant tray. Thus, the plant trays are spaced apart vertically along the vertical support shaft. Each of the plant trays has a base which has a upper or obverse side and a lower or reverse side. The base includes at least one water discharge aperture therethrough. In an embodiment, the obverse side of the base further comprises plurality of recessed grooves that have a predetermined depth and which are sized and shaped to receive water therein. The reinforcing grooves may be oriented radially, or circumferentially, or both. In an embodiment the reverse side of the base includes a plurality of reinforcing ribs. The reinforcing ribs may be oriented radially, or circumferentially, or both.

In an embodiment, the novel plant hanger with a multi-level assembly of plant trays may be coupled to a trolley conveyor that is provided with a track along a defined path and supported from an overhead or ceiling support in a plant factory. A moveable endless chain unit is provided inside the track. With the trolley conveyor, a novel plant hanger with a multi-level assembly of plant trays can be moved within a plant factory as necessary for planting, maintenance, growth, and harvest. The plant novel plant hanger with a multi-level assembly of plant trays described therein may be used to support various types of plants for cultivation in a plant factory.

BRIEF DESCRIPTION OF THE DRAWING

The present invention(s) are described herein by way of exemplary embodiments, using for illustration the accompanying drawing in which like reference numerals denote like elements in the various figures of the drawing, and in which:

FIG. 2A is a top plan view of a plant tray for use in manufacturing a multi-level assembly of plant trays, showing the upper or obverse side of a plant tray.

FIG. 2B is a bottom plan view of a plant tray for use in manufacturing a multi-level assembly of plant trays, showing the lower or reverse side of a plant tray.

Figure 1:
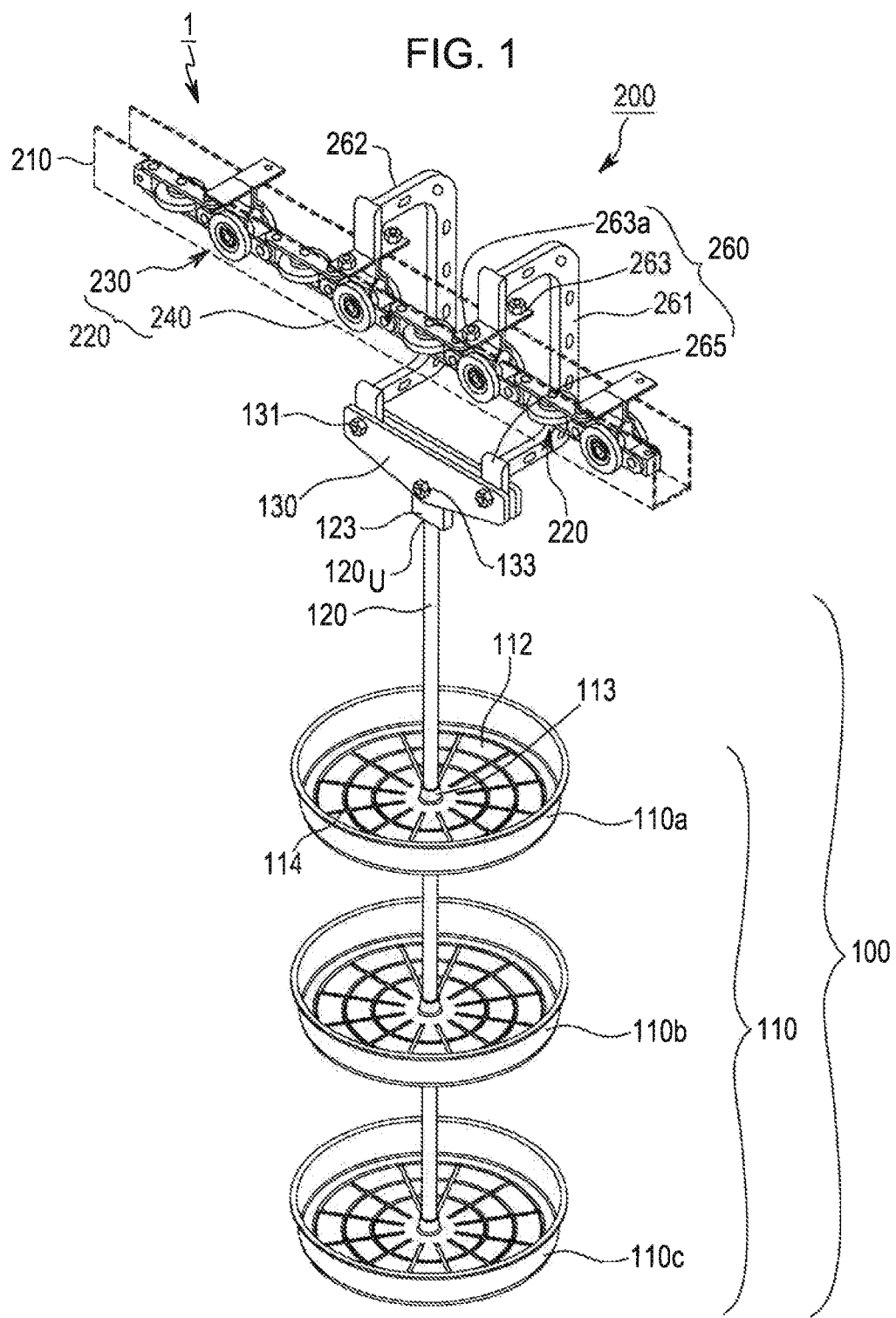
FIG. 1 is an exemplary perspective view of a novel plant hanger with a multi-level assembly of plant trays, showing the plant hanger coupled to a trolley conveyor that is provided for movement along a track in a plant factory.

The foregoing figures, being merely exemplary, contain various elements that may be present or omitted from a particular final configuration for an embodiment of a plant hanger having a multi-level assembly of plant trays, as used with a trolley conveyor system in a plant factory. However, there is no intention to limit the claimed invention to dimensional data, and thus any suggestion provided by any of the drawing figures of this specification are exemplary rather than mandatory. The materials of construction, and the techniques and materials used for joining various components may varied without affecting the scope of the appended claims. An attempt has been made to draw the figures in a way that illustrates at least those elements that are significant for an understanding of exemplary plant hanger with a multi-level assembly of plant trays, and the use of such structures with a trolley conveyor system, and include particulars that may be varied for specific situations.

It should be understood that various features may be utilized in accord with the teachings hereof, as may be useful in different embodiments, depending upon the specific requirements such as vertical spacing between horizontally oriented plant trays, or the vertical space available between the trolley conveyor system and the floor below, all within the scope and coverage of the teachings herein as defined by the claims. Further, like features in various embodiments may be described using like reference numerals, or other like references, without further mention thereof.

DETAILED DESCRIPTION

Attention is directed to FIG. 1, a novel plant hanger 100 with a multi-level assembly of plant trays 110, including plant trays 110a, 110b, and 110c is illustrated coupled to a trolley conveyor 200. The trolley conveyor 200 is provided for linear motion using a stationary tubular rail track 210 along a defined path, and which may be supported from an overhead or ceiling support (not shown) in a plant factory. Trolley conveyor 200 includes multiple first chain units 230 and multiple second chain units 240, as further described below. By using the trolley conveyor 200, a plurality of novel plant hangers 100 with a multi-level assembly of plant trays 110 can be moved within a plant factory as necessary for planting, maintenance, growth, and harvest of plants grown in the plant trays 110. The novel plant hanger 100 with a multi-level assembly of plant trays 110 described therein may be used to support various types of plants for cultivation in a plant factory.

Figure 3:
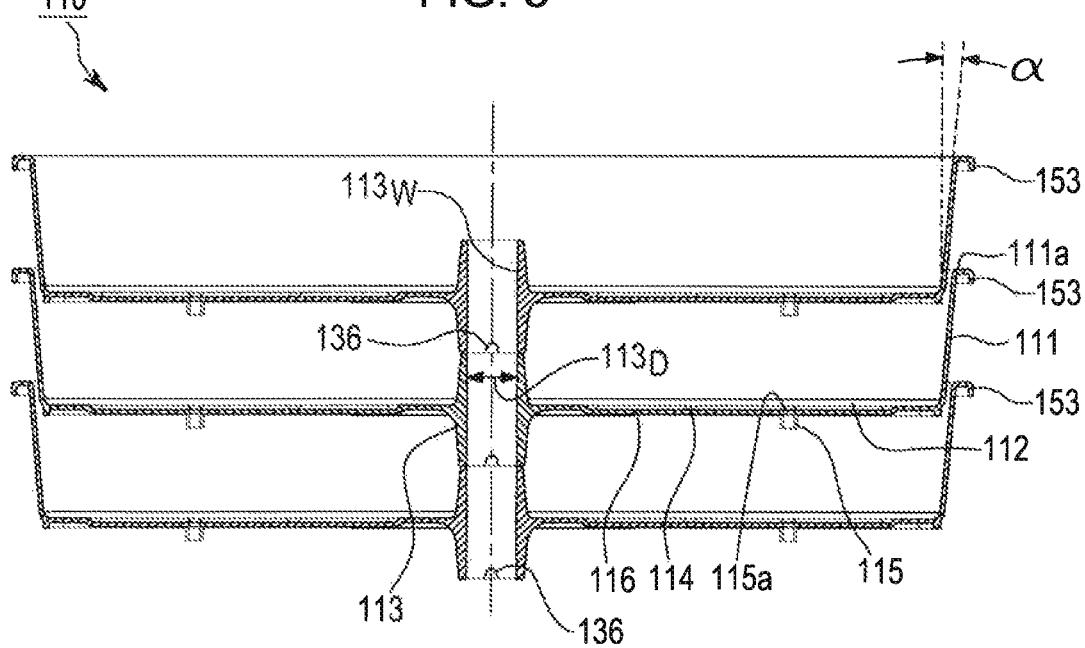
FIG. 3 is a vertical cross-sectional view of a set of plant trays, showing three plant trays in a stacked position (as may be useful for storage, or for planting) but where the plant trays are not affixed to a vertical support shaft in a spaced apart manner as shown in FIG. 1 above.
Figure 4:
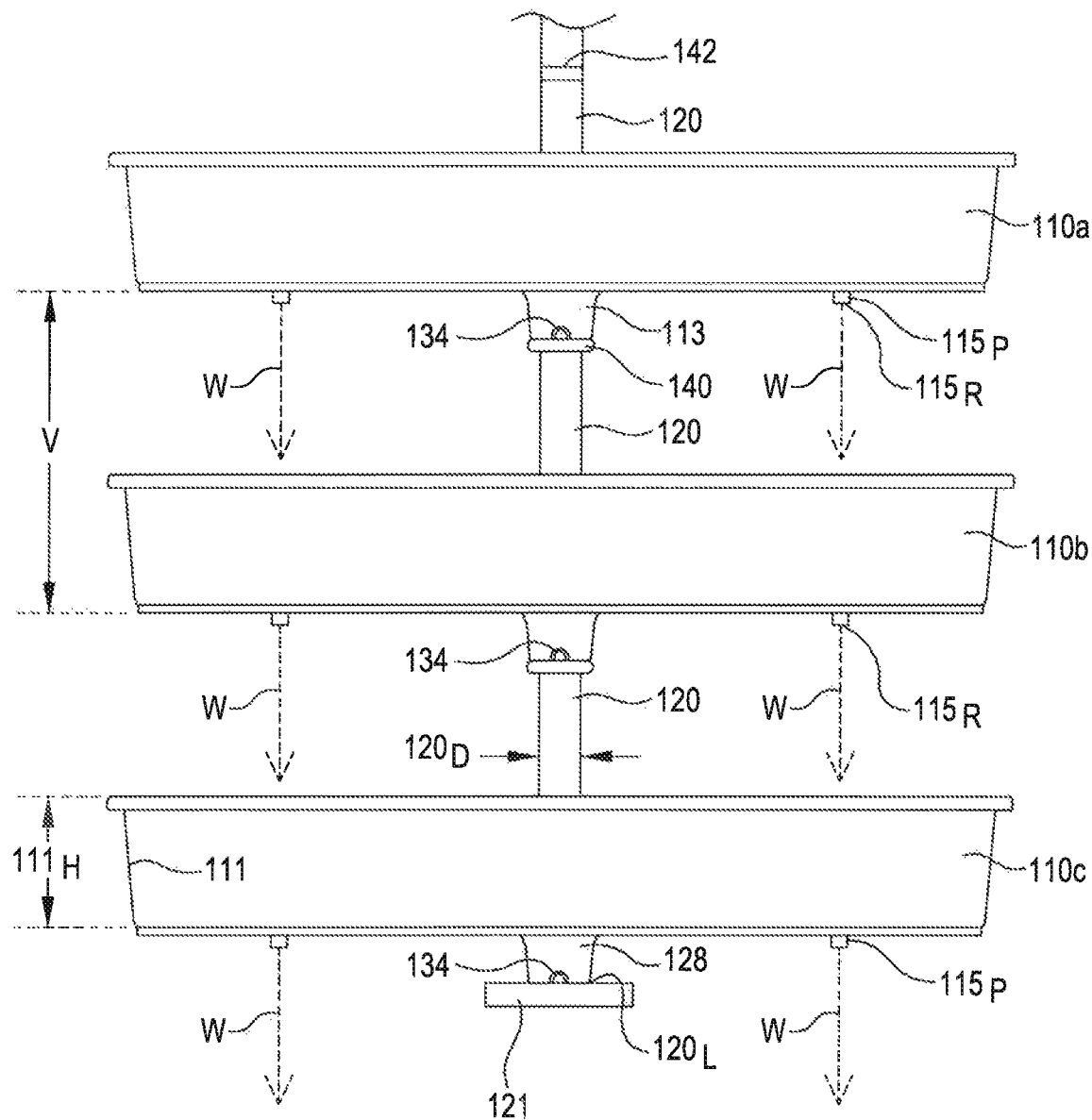
FIG. 4 is an exemplary side elevation view of a portion of a plant hanger using a multi-level assembly of plant trays, showing three plant trays spaced apart vertically and affixed to a vertical support shaft, and also showing how apertures through the base of each of the plant trays provide a passageway for excess water to pass through a plant tray move on downward for deposit in the next plant tray therebelow, or to the ground, if water is draining from a lowermost plant tray.
Figure 6:
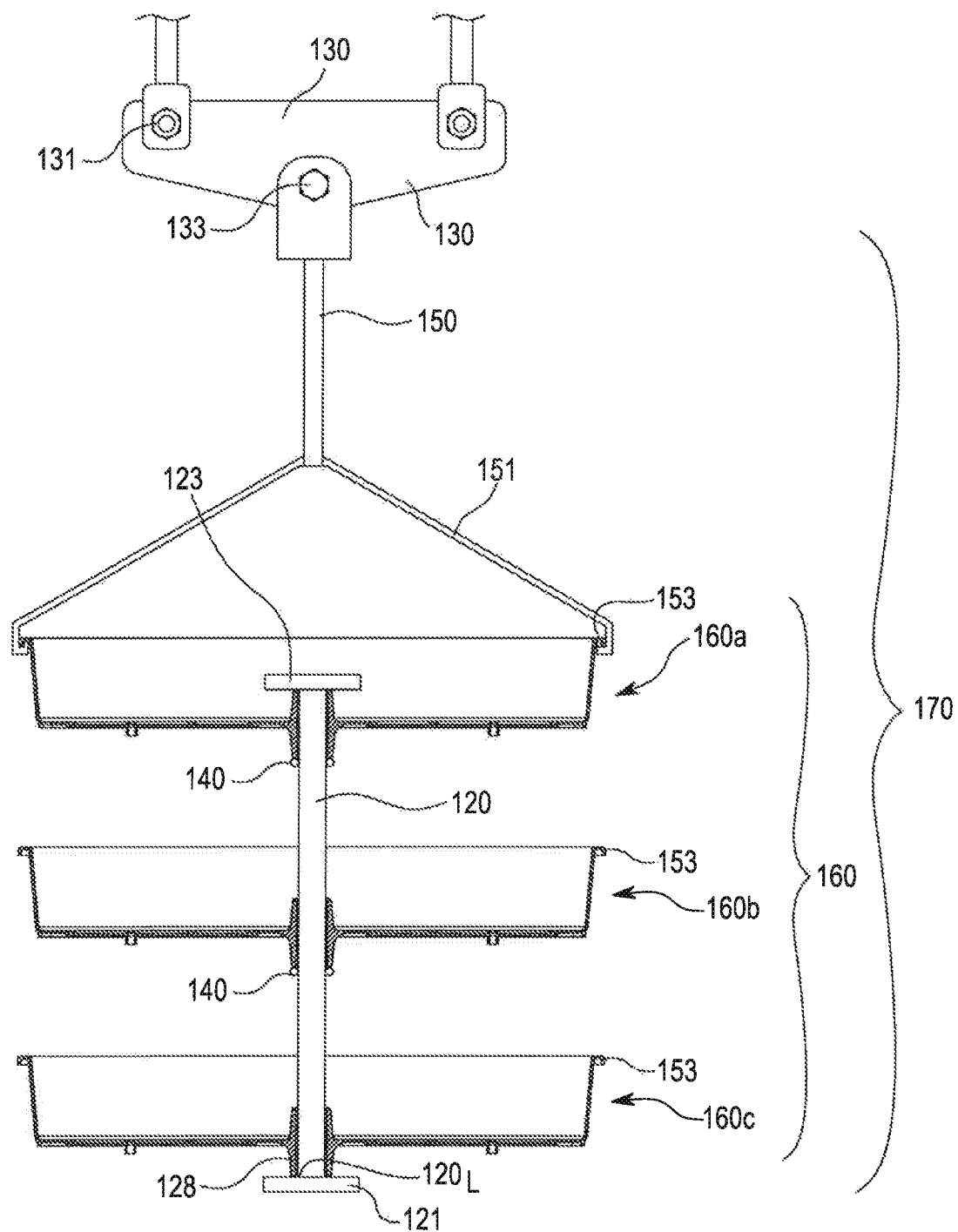
FIG. 6 is an exemplary side elevation view of another embodiment for support of a plant hanger using a multi-level assembly of plant trays, showing use of a plant tray hanger which is attached to rim regions of an uppermost plant tray, with the plant tray hanger coupling the plant hanger to a trolley conveyor.

As seen in FIG. 1, a plant hanger 100 for cultivating plants may be provided using a vertical support shaft 120, which extends between an upper end $120_U$ and a lower support end $120_L$, as seen in FIGS. 4 and 6. Returning now to FIG. 1, a plurality of plant trays 110 are provided. In an embodiment, an uppermost plant tray 110a, a middle plant tray 110b, and a lowermost plant tray 110c, may be provided. Of course, the plurality of plant trays 110 is not limited to two or three, and the number of plant trays 110 may be increased where vertical space permits, given vertical dimensions of a plant factory and the nature and size of the plants (not shown) being grown. Each one of the plant trays has a center aperture therethrough, as defined by interior walls $113_W$ of shaft coupler 113 (see FIG. 3). Shaft coupler 113 is affixed to base 112 of plant trays 110. When plant trays 110 are circular, the shaft coupler 113 is affixed at a center throughhole $110_L$ (see FIG. 2A) provided along the centerline of the plant tray 110. However, the use of circular plant trays 110 is only an example, as it should be understood that plant trays 110 (e.g. plant trays 110a, 110b, and 110c) may be provided in various shapes including a square configuration.

The plant trays 110 (e.g. 110a, 110b, and 110c) are each coupled to the vertical support shaft 120 at their center. The plant trays 110 are spaced apart vertically a distance V along the vertical support shaft 120. Distance V may be uniform, or may vary in any plant hanger 100 multi-plant tray assembly. Each of the plant trays 110 includes a base 112 which spreads outward from the center of the plant tray 110. The base 112 has an obverse side $112_O$, illustrated in FIG. 2A, and a reverse side $112_R$, illustrated in FIG. 2B. The base 112 has at least one water discharge aperture 115 therethrough, i.e. a drain, with entrance $115_O$ on the obverse side $112_O$ and exit $115_R$ on the reverse side $112_R$, and thus is defined by sidewalls therebetween. In an embodiment, multiple water discharge apertures 115 may be provided in a plant tray 110.

In various embodiments a plurality of recessed water moving grooves 114, sized and shaped to receive water therein and to allow water to move along therein, are provided on the inner bottom surface, i.e. on the obverse side $112_O$ of base 112 of the plant trays 110a, 110b, and 110c. The recessed water moving grooves 114 may be configured from a centrally depressed area $112_C$ around the shaft coupler 113, and then be configured as radial grooves $114_R$, which may be provided as radial segments oriented in a spoke like fashion. Also, circular or at least partially circumferential recessed water moving grooves $114_C$ may be provided. The circumferential recessed grooves may be provided concentrically at a predetermined depth, to form a path through which water is moved. In various embodiments, the radial grooves $114_R$ and the circumferential grooves $114_C$ may be joined (see joint $114_X$), to allow better water flow around the obverse side $112_O$ of base 112. With the construction of plant trays 110 as just described, water applied to an uppermost plant tray 110a will move through soil (not shown) in a plant tray 110 with plants therein, and thence downward and outward through water discharge apertures 115, and on the next plant tray 110b therebelow, and so on until the bottom plant tray (here, plant tray 110c, although additional plant trays may be utilized) is reached, and from which excess water will drain through final water discharge apertures 115 to the floor (not shown) of a plant factory. In various embodiments, an exit $115_O$ may be provided through a water discharge pipe $115_P$ formed to protrude from the reverse side 112R of base 112, as seen in FIG. 4.

Turning now to FIG. 2B, where the reverse side $112_R$ (i.e. bottom surface) of the base 112 of a plant tray 110 is shown, a radial reinforcing rib 116 for reinforcing the strength of the plant tray 110 may be provided (same for each of plant trays 110a, 110b, and 110c). When the plant tray 110 is circular, reverse side $112_R$ of the base 112 includes a plurality of radial ribs 116. The radial ribs 116 at least include radial segments oriented in a spoke like fashion. Additionally, the reverse side $112_R$ of base 112 includes a plurality of circular ribs 117, which in various embodiments are at least partially circumferential in configuration, if not entirely circular. In an embodiment, the circular ribs 117 may be oriented concentrically. The circular ribs 117 and the radial ribs 116 are interconnected (see typical joint 118), so as to improve structural strength of the plant tray 110.

In an embodiment, a plant hanger 100 may include a bottom support clamp 128 which is configured to retain a lowermost plant tray (e.g. 110c) in a plurality of plant trays 110 affixed to a vertical support shaft 120. In an embodiment, the bottom support clamp 128 may include a flat lower surface 121 configured to support the plant hanger 100 when placed on a support surface (not shown) such as a factory floor. The area of a plate forming a flat lower surface 121 may be provided with a larger width and surface area than the bottom support clamp itself located under the lowest plant tray 110c.

In an embodiment, a plant hanger 100 may further include a bracket coupling plate 123 located at the upper end $120_U$ of the vertical support shaft 120. The bracket coupling plate 123 is configured for attachment to a hanger coupling bracket 130 on a trolley conveyor 200, so that the plant hanger 100 can be suspended therefrom.

As seen in FIG. 4, it should be noted that the height $111_H$ of wall 111 of a plant tray 110 may be variously provided according to the type of plant to be planted. Accordingly, plant trays 110a, 110b, and 110c are filled with soil, and plants are planted (not shown).

As illustrated in FIG. 3, when the plant trays 110a, 110b, and 110c are not being used, it is preferable to store the plurality of plant trays 110a, 110b, and 110c by stacking one on top of the other as shown in FIG. 3, as the ability to store plant trays 110 in this configuration allows storage space to be reduced. To enable such storage, the wall 111 may be angled outward at an angle alpha ($\alpha$) sufficient that trays will nest in a manner as illustrated in FIG. 3. In other words, the alpha ($\alpha$) would be sufficiently large that trays the bottom of one plant tray 110 will be inside of rim 153 of the plant tray 110 immediately below. In an embodiment, with a circular plant tray 110, the wall 111 of plant tray 110 may be formed at an incline to gradually increase in diameter from the bottom of wall 111 to the top of wall 111. As noted in FIG. 3, mounting lips 111a may be provided, bent outward by a predetermined distance, as useful in handling plant trays 110, as well as when using the hanger 151 configuration illustrated in FIG. 6.

As seen in FIG. 6, the mounting lips 111a may be used with hangers 151 to suspend via hangar shaft 150 a plant hanger 160 having multiple level plant trays such as plant trays 160a, 160b, and 160c located along vertical support shaft 120 in the manner above described.

As may be seen using FIGS. 3 and 4, shaft coupler 113 may be provided in pipe form which has an interior diameter defined by interior sidewall $113_W$. The shaft coupler 113 is provided in the central region of plant trays 110, such as plant trays 110a, 110b, and 110c. The inner diameter $113_D$ of the shaft coupler 113 closely corresponds to the outer diameter $120_D$ of the vertical support shaft 120, to which the shaft coupling is fitted. As a result, the plant trays 110a, 110b, and 110c are all coupled to vertical support shaft 120 via their respective shaft coupler 113. In an embodiment, the vertical support shaft 120 may include a plurality of apertures (not shown) into which pin 134 may be inserted, and against which notch 136 (see FIG. 3) in shaft coupler 113 downwardly rests, to keep plant trays in a secure location along vertical support shaft 120. Also, or alternately, a fixing member 140 such as a rubber ring may be used as stop, which contacts both the shaft coupler 113 and the vertical support shaft 120, to prevent downward movement of a plant tray 110 along the vertical support shaft 120, even with the weight of soil and plants filled therein. Additionally, the vertical support shaft 120 may be provided with horizontally oriented grooves (generally, hidden and now shown, but exemplary groove 142 seen in FIG. 4) at a vertical height along the vertical support shaft 120 where it may be desirable to position as plant tray 110 by using a fixing member 140. The fixing member 140 should be formed with sufficient thickness and strength around the vertical support shaft 120 to supports the shaft coupler 113, to prevent the plant tray 110 from being moved downward along the vertical support shaft 120 due to the weight of the plant trays 110a, 110b, and 110c, and their content of plants, soil, and water.

In an embodiment, the plant hanger assembly 100 or 170 may be advantageously utilized with a trolley conveyor 200. In an embodiment, a trolley conveyor 200 may be provided having a stationary tubular rail track 210. The stationary tubular rail track 210 has a bottom wall $210_B$, inner sidewalls $210_1$ and $210_2$, and a slotted upper wall 212 defining an open slot 211 between upper end walls $212_1$ and $212_2$.

A trolley conveyor 200 is provided. A trolley chain with repeating chain portions 220 (see FIG. 5) is installed inside the stationary tubular rail track 210 for longitudinal movement with respect to the stationary tubular rail track 210. A trolley chain is made up of endlessly joined chain portions 220, with each chain portion 220 having a first chain unit 230 and a second chain unit 240. The first chain unit 230 further includes a first chain link 231 with body 231b elements and which has a pair of vertical rollers 231a rotatably affixed thereto for rotation on the bottom wall $210_B$ of the stationary tubular rail track 210. The vertical rollers 231a and 241a are sized and shaped for ease of rolling action within the stationary tubular rail track 210, and more specifically, to ride along on the bottom wall $210_B$ of the stationary tubular rail track 210. A bearing (not shown) may be provided between the vertical roller 231a and shaft 231c, and between the vertical roller 241a and the shaft 241c. The first chain unit 230 also includes a second chain link 233 with body 233b elements and which includes one or more horizontal rollers 233a for rotation against at least one of the inner sidewalls $210_1$ and $210_2$ of the stationary tubular rail track 210. The horizontal rollers 233a and 243a are sized and shaped for ease of rolling action within the stationary tubular rail track 210. A bearing (not shown) may be provided between the horizontal roller 233a and shaft 233c, and between the horizontal roller 243a and the shaft 243c. The first chain link 231 and the second chain link 233 of the first chain unit 230 are pivotally attached each to the other at an intermediate pivot block 235, having horizontal pivot pin 235c and vertical pivot pin 235d there through, disposed for pivoting motion.

Similarly, the second chain unit 240 further includes a third chain link 241 with body 241b portions and which has a pair of vertical rollers 241a rotatably affixed thereto for rotation on the bottom wall $210_B$ of the stationary tubular rail track 210. The second chain unit 240 also includes a fourth chain link 243 with body 243b portions and which includes one or more horizontal rollers 243a for rotation against at least one of the inner sidewalls $210_1$ and $210_2$ of the stationary tubular rail track 210. The third chain link 241 and the fourth chain link 243 of the second chain unit 240 are pivotally attached each to the other at an intermediate pivot functionally similar or identical to previously described pivot block 235 and has a having horizontal pivot pin and vertical pivot pin there through (omitted for drawing clarity), disposed for pivoting motion, as earlier described. Similarly, the first chain unit 230 and the second chain unit 240 are pivotally attached each to the other at an intermediate pivot 247 functionally similar or identical to the previously described pivot block 235 and has a horizontal pivot pin 247c and vertical pivot pin 247d there through, disposed for pivoting motion, as earlier described. Likewise, sequential chain portions 220 are pivotally attached each to the other with end pivot blocks 237, utilizing horizontal pivot pins 237a and vertical pivot pins 237d.

Necks 231e and 241e extend upward from adjacent the trolley chain units 230 and 240, and extend upward between, with clearance from, and then upward beyond the open slot 211 defined by upper end walls $212_1$ and $212_2$ in the slotted upper wall 212 of the stationary tubular rail track 210. The necks 231e and 241e then support one or more laterally extending attachment flanges 231d and 241d.

A plurality of hangers 260 are provided. Each one of the plurality of hangers 260 has an upper end 262. The upper end 262 includes downwardly extending connectors configured for attachment of the hangers to the one or more attachment flanges 231d or 241d. The hangers 260 have a lower end 265 configured to attach plant hangers 100 or 170 therefrom. A hanger body 261 extends between the upper end 262 and the lower end 265.

The plant hangers 100 or 170 are vertically suspended from the hanger coupling bracket 130 on a trolley conveyor 200, so that the plant hangers 100 or 170 can be suspended therefrom.

A first hanger coupling flange 231d is formed to extend a predetermined area horizontally from the upper portion of the first neck 231e and is coupled to the flange coupling plate 263 of the hanger 260. First fastening holes 231f are formed on both sides of the first hanger coupling flange 231d, and are coupled to the hanger 260 by the flange coupling plate 263 and the first fastening member 263a. Similarly, a second hanger coupling flange 241d is formed to extend a predetermined area horizontally from the upper portion of the first neck 231e and is coupled to the flange coupling plate 263 of another hanger 260. Second fastening holes 241f are formed on both sides of the second hanger coupling flange 241d, and are coupled to a second hanger 260 by a flange coupling plate 263 and another fastening member 263a.

As shown and described, the hanger body 261 of hangers 260 is arranged eccentrically on one side of the stationary tubular rail track 210 in a "C" shape. Thus, the load of the plant support cage assembly 100 is provided under the hangers 260, and may become eccentric, i.e. tends to load off to the side. Consequently, if the hanger body 261 is eccentric in this way, it was found that the repeating chain units 220 might be inclined toward one side of the stationary tubular rail track 210, and thus not move smoothly. In order to solve this problem, the chain 220 of the present invention provides a continuous chain in which the vertical rollers and the horizontal rollers are alternately arranged.

In various embodiments, a plurality of plant trays 110 are provided for use in a plant factory. The plant trays 110 each provide a structure in which water can be drained downward and out of the plant trays 110. Soil is accommodated in the plant trays 110, and plants are planted in the soil. In an embodiment, a plant tray 110 may be preferably be provided in a material having as light weight as possible, since reduced weight will result in reduced power requirements for movement of the plant hangars 100 or 170 via the trolley conveyor 200.

More generally, the plant hangers 100 or 170 allow a grower to grow plants while they are suspended from a trolley conveyor 200 in a plant factory, and allows plants to be moved around via the trolley conveyor 200. Importantly, the plants located in the plant trays 110 are not located on the ground, and thus the plants are allowed to grow while they are suspended in the air, and are from time to time transported via the trolley conveyor 200.

The trolley conveyor 200 is moved along, when desired, under the control of a control unit (not shown) of a plant factory to enable the grower to control the positions of a plurality of plant hangars 100 or 170, and thus control the planting, growing, and harvesting locations and conditions in a plant factory. As an example, the amount of sunlight (or artificial light) received by plants in the plant trays 110 on each of the plant hangars 110 or 170 may be equally adjusted, or varied as appropriate. Likewise, the plant hangars 100 or 170 may be periodically moved to a water supply area, where the plants may be watered as appropriate.

By use of the above described apparatus and methods, bulky fruits such as cucumbers, with otherwise unwieldy branches and stems, may be planted in plant trays 110 or 160, and coupled to the trolley conveyor 200, so that they can be grown under uniform growing conditions. This method, and use of the apparatus described herein, makes it possible to harvest fruits and vegetables of uniform quality.

In addition, when the growth is completed, and plants such as peppers, cucumbers, and eggplants need to be harvested, a worker may use the trolley conveyor 200 to move the plant support cage assemblies 100 to the place where a worker may pick and pack the ripened fruit or vegetables. This technique can greatly reduce the number of workers required, and thus reduce costs for the labor force required in a plant factory.

Figure 5:
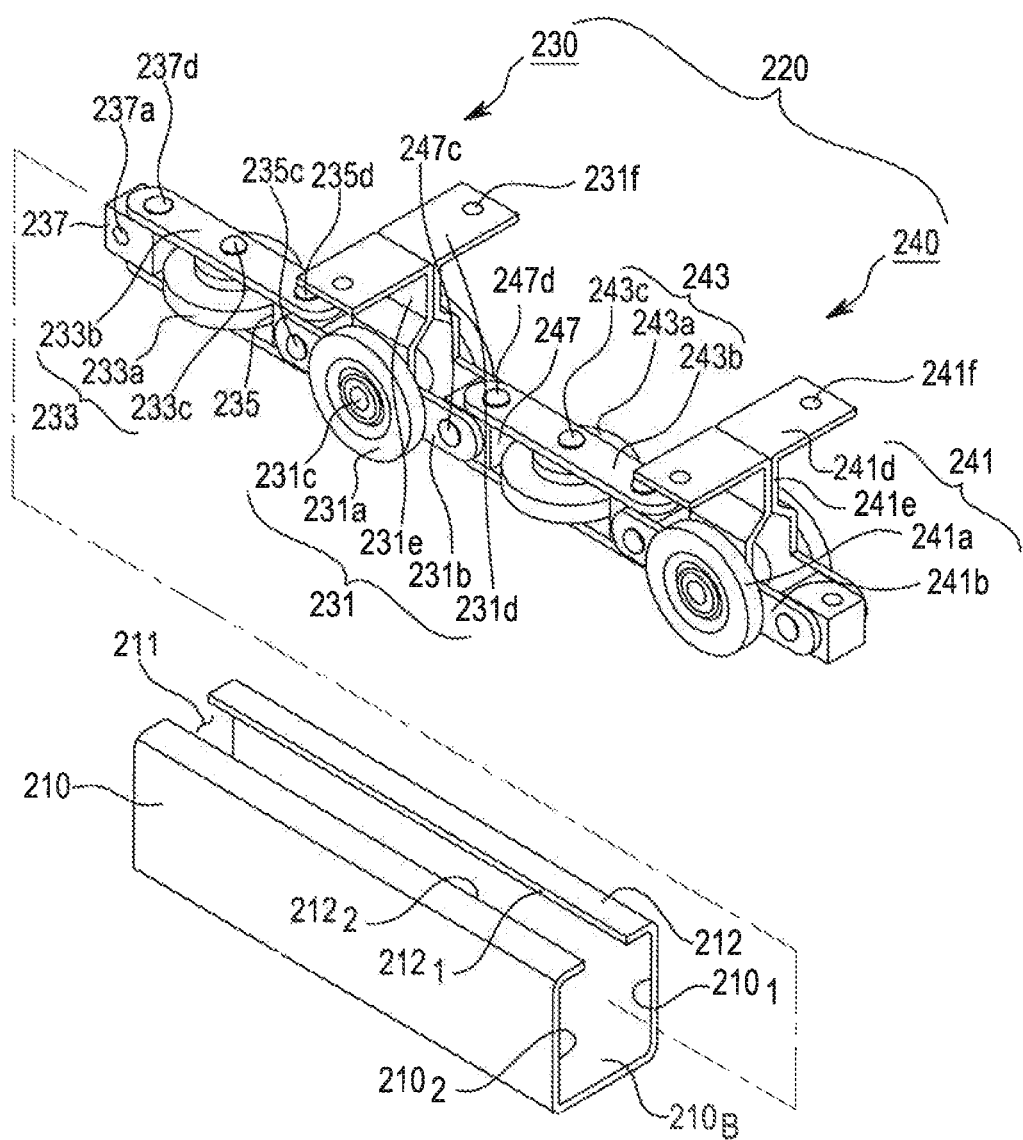
FIG. 5 is an exploded perspective view showing an embodiment for components of a track and portions of an endless chain for a trolley conveyor.

For further reference, FIG. 5 shows a perspective view of key portions of a trolley conveyor suitable for use with the plant hangars 100 or 170 as described herein. As shown in FIGS. 4 and 5, the trolley conveyor 200 includes a stationary tubular rail track 210 formed in a predetermined path on the ceiling of a plant factory, an endless chain repeating units 220 moving along the stationary tubular rail track 210. Many plant hangars 100 or 170, or both, are suspended for transport by the trolley conveyor 200. However, since the key details have already been described hereinabove, they need not be repeated.

The endless chain repeating units 220 are driven by a chain driving unit (not shown). In an embodiment, a plurality of chain drive units (not shown) may be provided on the outer side of the stationary tubular rail track 210 at regular intervals so that the endless chain repeating units 220 are smoothly urged to move along in stationary tubular rail track 210. In an embodiment, such chain driving units may be provided using an electric motor to drive a geared mechanism to interface with the endless chain repeating units 220. A suitable control system may be utilized within the plant factory for control of the drive of the endless chain repeating units 220, as those of skill in the art will readily appreciate and be able to design and supply.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the details as described herein may be useful in supporting and moving plants, for growth and movement in a plant factory, and as such may be modified from those embodiments provided herein, without materially departing from the novel teachings and advantages provided.

Thus, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation, scope, and range properly afforded to the plain meaning of the claims set herein.

The invention claimed is:

1. A plant hanger for cultivating plants, comprising:
a vertical support shaft; the vertical support shaft extending between an upper end and a lower support end;
a plurality of plant trays, each one of the plant trays having a center aperture defined by interior sidewalls of a shaft coupler, wherein the plant trays are each coupled to the vertical support shaft by the shaft coupler, and wherein the plant trays are spaced apart vertically along the vertical support shaft; and wherein each one of the plant trays further comprises a base, the base having an obverse side and a reverse side, and wherein the base further comprises at least one water discharge aperture therethrough;
wherein the obverse side of the base further comprises a plurality of recessed grooves, the recessed grooves having a predetermined depth and sized and shaped to receive water therein;
wherein each of the plant trays are circular, and wherein the recessed grooves comprise a plurality of radially extending grooves; and
wherein the recessed grooves further comprise a plurality of circular grooves, and wherein the circular grooves are oriented concentrically.

2. A plant hanger as set forth in claim 1, wherein the circular grooves and the radial grooves are interconnected, so that water may flow from radial grooves to circular grooves, or from circular grooves to radial grooves.

3. A plant hanger as set forth in claim 1, wherein each of the plant trays are circular, and wherein the reverse side of the base comprises a plurality of radially extending ribs.

4. A plant hanger as set forth in claim 3, wherein the reverse side of the base further comprises a plurality of circular ribs, and wherein the circular ribs are oriented concentrically.

5. A plant hanger as set forth in claim 4, wherein the circular ribs and the radial ribs are interconnected, so as to improve structural strength of the plant tray.

6. A plant hanger as set forth in claim 1, further comprising a support clamp located at the lower support end of the vertical support shaft, wherein the support clamp is configured to retain a lowermost plant tray of the plurality of plant trays on the vertical support shaft.

7. A plant hanger as set forth in claim 6, wherein the support clamp further comprises a flat lower surface configured to support the plant hanger when placed on a support surface.

8. A plant hanger as set forth in claim 1, further comprising a bracket coupling plate located at the upper end of the vertical support shaft, the bracket coupling plate configured for attachment to a hanger coupling bracket on a trolley conveyor, so that the plant hanger can be suspended therefrom.

9. A plant hanger as set forth in claim 1, wherein the base of the plant trays comprise at least two water discharge apertures therein, and where the water discharge apertures are each located at one of the recessed grooves, and configured to allow water to drain from the recessed grooves and downward through one of the water discharge apertures.

10. A combination of a plant hanger for cultivating plants and a trolley conveyor, comprising:
(a) a vertical support shaft; the vertical support shaft extending between an upper end and a lower support end;
a plurality of plant trays, each one of the plant trays having a center aperture defined by interior sidewalls of a shaft coupler, wherein the plant trays are each coupled to the vertical support shaft at their center by the shaft coupler, and wherein the plant trays are spaced apart vertically along the vertical support shaft; and wherein each one of the plant trays further comprises a base, the base having an obverse side and a reverse side, and wherein the base further comprises at least one water discharge aperture therethrough, wherein the obverse side of the base further comprises plurality of recessed grooves, the recessed grooves having a predetermined depth and sized and shaped to receive water therein, and wherein the reverse side of the base further comprises a plurality of reinforcing ribs;

(b) a trolley conveyor, the trolley conveyor comprising a stationary tubular rail track, the stationary tubular rail track having a bottom wall, inner sidewalls, and a slotted upper wall defining an open slot between upper end walls;

a trolley chain, the trolley chain installed inside the stationary tubular rail track for movement with respect to the stationary tubular rail track, the trolley chain comprising endlessly joined chain portions, each chain portion comprising a first chain unit and a second chain unit, the first chain unit further comprising first chain link and a second chain link, the first chain link comprising a pair of vertical rollers rotatably affixed to the first chain link for rotation on the bottom wall of the stationary tubular rail track, and the second chain unit comprising at least one horizontal roller rotatably affixed to the second chain link for rotation against at least one of the inner sidewalls of the stationary tubular rail track, wherein the first chain unit and the second chain unit are pivotally attached each to the other at an intermediate pivot block, the second chain unit further comprising third chain link and a fourth chain link, the third chain link comprising a pair of vertical rollers rotatably affixed to the third chain link for rotation on the bottom wall of the stationary tubular rail track, and the fourth chain unit comprising at least one horizontal roller rotatably affixed to the fourth chain link for rotation against at least one of the inner sidewalls of the stationary tubular rail track, wherein the third chain link and the fourth chain link unit are pivotally attached each to the other at an intermediate pivot block, wherein sequential chain portions are pivotally attached each to the other with end pivot blocks;

necks extending upward from adjacent chain portions of the trolley chain, the necks extending upward between and beyond the upper end walls in the slotted upper wall of the stationary tubular rail track;

outwardly oriented attachment flanges extending laterally from the necks;

a plurality of trolley hangers, each of the plurality of trolley hangers comprising (1) an upper end, the upper end having downwardly extending connectors configured for attaching the trolley hangers to the one or more of the outwardly oriented attachment flanges, (2) a lower end configured to hang plant support parts therefrom, and (3) a trolley hanger body extending between the upper end and the lower end; and (c) plant hanger supports, the plant hanger supports connected to the trolley hangers, the plant hanger supports including a body and a coupler, wherein the coupler is detachably affixed to a vertically secured assembly of plant trays, so that the vertically secured assembly of plant trays is vertically suspended from the coupler for transport via the trolley conveyor.

11. A combination as set forth in claim 10, wherein the plant supports comprise a pair of bracket coupling plates, the bracket coupling plates connected to two adjacent hangers in the plurality of hangers.

12. A combination as set forth in claim 10, wherein each of the plant trays are circular, and wherein the recessed grooves comprise a plurality of radially extending grooves.

13. A combination as set forth in claim 12, wherein the recessed grooves further comprise a plurality of circular grooves, and wherein the circular grooves are oriented concentrically.

14. A combination as set forth in claim 13, wherein the circular grooves and the radial grooves are interconnected, so that water may flow from radial grooves to circular grooves, or from circular grooves to radial grooves.

15. A combination as set forth in claim 10, wherein each of the plant trays are circular, and wherein the reverse side of the base comprises a plurality of radially extending ribs.

16. A combination as set forth in claim 15, wherein the reverse side of the base further comprises a plurality of circular ribs, and wherein the circular ribs are oriented concentrically, and wherein the circular ribs and the radial ribs are interconnected, so as to improve structural strength of the plant tray.

* * * * *